(12) United States Patent
Lin et al.

(10) Patent No.: US 9,801,162 B2
(45) Date of Patent: Oct. 24, 2017

(54) METHOD AND DEVICE FOR DETERMINING UPLINK CONTROL CHANNEL RESOURCES

(71) Applicant: CHINA ACADEMY OF TELECOMMUNICATIONS TECHNOLOGY, Beijing (CN)

(72) Inventors: Yanan Lin, Beijing (CN); Zukang Shen, Beijing (CN); Xueming Pan, Beijing (CN); Xuejuan Gao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 160 days.

(21) Appl. No.: 13/626,761

(22) Filed: Sep. 25, 2012

(65) Prior Publication Data
US 2013/0077541 A1 Mar. 28, 2013

Related U.S. Application Data

(63) Continuation of application No. PCT/CN2011/072206, filed on Mar. 28, 2011.

(30) Foreign Application Priority Data

Mar. 29, 2010 (CN) .......................... 2010 1 0136326

(51) Int. Cl.
*H04L 5/14* (2006.01)
*H04W 72/04* (2009.01)
(Continued)

(52) U.S. Cl.
CPC ....... *H04W 72/0413* (2013.01); *H04L 1/1607* (2013.01); *H04L 1/1861* (2013.01); *H04L 5/001* (2013.01); *H04L 5/0055* (2013.01)

(58) Field of Classification Search
CPC .......... H04W 72/0453; H04W 74/002; H04W 72/0413
See application file for complete search history.

(56) References Cited

U.S. PATENT DOCUMENTS

2008/0212506 A1 * 9/2008 Lee et al. ...................... 370/310
2008/0311942 A1 12/2008 Kim et al.
(Continued)

FOREIGN PATENT DOCUMENTS

CN 101227703 7/2008
CN 101227703 A * 7/2008 ............... H04L 1/18
(Continued)

OTHER PUBLICATIONS

Qualcomm Europe: "Clarify TDD Ack/Nak resource index on PUCCH" 3GPP Draft; R1-094857 36.213 Clarifying TDD an Resource Index on PUCCH, 3GPP, Nov. 9-13, 2009.
(Continued)

*Primary Examiner* — Lakeram Jangbahadur
(74) *Attorney, Agent, or Firm* — Ladas & Parry, LLP

(57) ABSTRACT

A method and a device for determining uplink control channel resources are disclosed by the embodiments of the present invention. With the technical solutions of the embodiments of the present invention, the uplink control resources, such as the ACK/NACK and the like, can be configured semi-statically. The method is applicable for both the FDD system and the TDD system. The overhead of the uplink feedback channel in the Long Term Evolution (LTE) carrier aggregation system is reduced. Therefore the system performance of the LTE multi-carrier advanced system is improved, and the system is compatible with the LTE Release 8 system well.

4 Claims, 4 Drawing Sheets the terminal equipment receiving the higher layer signaling sent by the BS, and the higher layer signaling carries the information of uplink control channel resource allocated to the terminal equipment — S701 the terminal equipment sending corresponding feedback information to the BS, according to its own configured feedback mode of the uplink control information and/or the transmission scheme of the uplink control channel, and the received information of uplink control channel resource — S702

(51) Int. Cl.
*H04L 1/18* (2006.01)
*H04L 1/16* (2006.01)
*H04L 5/00* (2006.01)

(56) References Cited

U.S. PATENT DOCUMENTS

| | | | | |
|---|---|---|---|---|
| 2010/0113048 | A1* | 5/2010 | Sawahashi et al. | 455/450 |
| 2011/0228731 | A1* | 9/2011 | Luo | H01Q 3/2605 370/329 |
| 2011/0243066 | A1* | 10/2011 | Nayeb Nazar | H04L 1/007 370/328 |
| 2011/0261729 | A1* | 10/2011 | Ahn et al. | 370/280 |
| 2012/0113831 | A1* | 5/2012 | Pelletier et al. | 370/252 |
| 2012/0134305 | A1* | 5/2012 | Damnjanovic et al. | 370/280 |
| 2013/0077541 | A1* | 3/2013 | Lin et al. | 370/277 |
| 2013/0077542 | A1* | 3/2013 | Yang et al. | 370/280 |
| 2013/0170447 | A1* | 7/2013 | Lin et al. | 370/329 |

FOREIGN PATENT DOCUMENTS

| | | |
|---|---|---|
| CN | 101247171 | 8/2008 |
| CN | 101350708 | 1/2009 |
| CN | 101505208 | 8/2009 |
| CN | 101588224 | 11/2009 |
| EP | 2152019 | 2/2010 |
| WO | 2008136468 | 11/2008 |

OTHER PUBLICATIONS

Nokia Siemens Networks, Nokia. "PUCCH resource allocation for carrier aggregation", 3GPP; R1-101417, Feb. 22-26, 2010.
CATT, PUCCH Format 1/1a/1b Resource Allocation with Transmit Diversity, R1-094558, 3GPP, Nov. 9-13, 2009.
CATT, "PUCCH Format 1/1a/1b Resource Allocation with Transmit Diversity", R1-100024, 3GPP, Jan. 18-22, 2010.
Research in Motion, UK Limited, "Transmission Mode Configuration for LTE-A Uplink Transmission", R1-094108, 3GPP, Oct. 12-16, 2009.
Research in Motion, UK Limited, "Further Discussion on Transmission Mode Configuration for LTE-A Uplink Transmission", R1-094456, 3GPP, Nov. 9-13, 2009.
Research in Motion, UK Limited, "Further Discussion on Transmission Mode Configuration for LTE-A Uplink Transmission", R1-100565, 3GPP, Jan. 18-22, 2010.
Nokia Siemens Networks, Nokia, "On MIMO transmission configurations for Multi-Tx Ues", R1-093325, 3GPP, Aug. 24-28, 2009.
ZTE, ACK/NACK Design for LTE-Advanced, R1-094739, 3GPP, Nov. 9-13, 2009.
LG Electronics. "Uplink ACK/NACK transmission in LTE-Advanced." R1-094163, 3GPP TSG RAN WG1 #58bis. Oct. 12-16, 2009.
ZTE, "Method for UL ACK/NACK resource allocation in LTE-A". R1-101561, 3GPP TSG RAN WG1Meeting #60. Feb. 22-26, 2010.
CATT, "Dynamic ACK/NACK Resource Reservation of PUCCH in LTE-A" R1-094545, 3GPP TSG RAN WG1 Meeting #59. Nov. 9-13, 2009.
Extended European Search Report for related EP Application No. 11761985.8 dated Sep. 16, 2013.
Notification of Refusal for related JP Application No. 2014-146835 dated Aug. 25, 2015 and its English translation.
Office Action for related CN Application No. 2010101363269 dated Feb. 5, 2013 and its English translation.
Office Action for related CN Application No. 2010101363269 dated Jul. 11, 2013 and its English translation.
Office Action for related CN Application No. 2010101363269 dated Nov. 6, 2013 and its English translation.
ISR and WO for related PCT/CN2011/072206 dated Jul. 7, 2011 and its English translation.
Notification of Reexamination for related Chinese Patent Application CN201010136326.9 dated Jan. 6, 2016, and its English translation.
Notification of Reexamination for related Chinese Patent Application CN201010136326.9 dated Jul. 5, 2016, and its English translation.
PCT International Preliminary Report on Patentability Chapter I from PCT/CN2011/072206 dated Oct. 2, 2012 and its English translation from WIPO.
Office action from Japanese Patent Application No. 2013-501608 dated Sep. 20, 2013, and its English translation.
Decision of Reexamination from Chinese Patent Application No. 201010136326.9 dated Oct. 25, 2016 and its English translation.
Panasonic, SORTD configurations for ACK/NACK information and SRI, R1-101266,3GPP, Feb. 26, 2010, pp. 1-4.
Ericsson, Clarification that there is no ACK/NACK multiplexing for configuration 5, R1-084372,3GPP, Nov. 14, 2008, pp. 1-6.

* cited by examiner

METHOD AND DEVICE FOR DETERMINING UPLINK CONTROL CHANNEL RESOURCES

CROSS-REFERENCE TO RELATED APPLICATIONS

This application is a continuation of International Patent Application No. PCT/CN2011/072206, entitled METHOD AND DEVICE FOR DETERMINING UPLINK CONTROL CHANNEL RESOURCES, filed on Mar. 28, 2011, and claims priority to Chinese Patent Application Ser. NO. 201010136326.9, entitled METHOD AND DEVICE FOR DETERMINING UPLINK CONTROL CHANNEL RESOURCES, filed on Mar. 29, 2010, the contents of both of which are hereby incorporated by reference in their entireties.

TECHNICAL FIELD

The present disclosure relates generally to communication technology, and, more particularly, to a method and device for determining uplink control channel resources.

BACKGROUND

The LTE (Long Term Evolution) system adopts HARQ (Hybrid Auto Repeat Request) to improve the reliability of data transmission, when the function of downlink HARQ is turned on, UE (User Equipment) performs coding to the received downlink data packets, if the coding is correct, then provides ACK (ACKnowledge Character) to BS (Base Station) as feedback, if the coding is failed, then provides NACK (Negative ACKnowledgment Character) to the BS as feedback, and requires the BS to retransmit data packets. After downlink continual scheduling service is over, the BS sends the releasing instruction of SPS (Semi-Persistent Scheduling) resources, notifying the UE to release all the resources that allocated to the service, the UE sends ACK to the BS as feedback after receive the notification correctly.

For multi-carrier LTE system, so as to support the system bandwidth which is larger than LTE system, such as 100 MHz, one possibility is to allocate the frequency spectrum of which the bandwidth is 100 M, as is shown in FIG. 1; one possibility is to polymerize some frequency spectrums that allocated to present system, and combine them as a large bandwidth to provide to multi-carrier LTE for using, at present the uplink and downlink carrier in system can be configured asymmetrically, which means UE may perform downlink transmission with occupying N≥1 carrier, and perform uplink transmission with occupying M≥1 carrier, as is shown in FIG. 2.

At present, the base transmission schema for LTE system (Rel-8), of which the standardization work is almost done, is as follows: FDD (Frequency Division Duplex) system and TDD (Time Division Duplex) system, as is shown in FIG. 3 and FIG. 4.

Downlink signaling, downlink data, uplink signaling, uplink data and the transmission relation between them are defined for each working carrier. The uplink control signaling occupies the both ends of the frequency band, and transmits through frequency hopping, which means the uplink control signaling will occupy different frequency channels to transmit in the two slots that in one subframe. As the number of the control channels that carried by the uplink subframe cannot be acquired dynamically, resources in uplink subframe are reserved by the system for the transmission of uplink control channel.

For dynamic scheduling ACK/NACK feedback transmission, the UE which are performing feedback will calculate the serial number ($n_{AN}$) of the resources (channel) that are used for performing ACK/NACK feedback, according to the CCE (Control Channel Element) serial number ($n_{CCE}$) that occupied by the PDCCH (Physical Downlink Control Channel), which is received by the UE, which means each PDCCH is corresponding to one available uplink control channel resource (transportable PUCCH format 1/1a/1b).

When the HARQ function is enabled in downlink transmission, after performing demodulation and coding to the data of downlink subframe n−k, the UE feeding back the signaling (ACK/NACK) whether the retransmission of the data in downlink subframe is needed to the BS on uplink subframe n.

For FDD system, k=4. For TDD system, k∈K, the values of the set K is related to the uplink and downlink configuration of system and the specific subframe serial number, as is shown in FIG. 1.

TABLE 1

| | Downlink association set index K: {$k_0, k_1, \cdots k_{M-1}$} for TDD | | | | | | | | | |
|---|---|---|---|---|---|---|---|---|---|---|
| UL-DL | Subframe n | | | | | | | | | |
| Configuration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Therein, multiple wireless frame are arranged in order, if the last subframe in wireless frame a is k, then the first subframe in wireless frame a+1 is k+1, the example of K that is corresponding to each uplink subframe for one wireless frame is given in Table 2, the n−k<0 represents the downlink subframe in previous wireless frame.

At present, for the UE that deployed with multiple transmitting antennas, using SORTD (Spatial Orthogonal Resource Transmit Diversity) to send diversity while performing uplink control channel transmission is provided in the research of the uplink control channel of LTE system, so as to improve the reliability and the capacity of the uplink control signaling transmission. The SORTD represents that each port of antenna is corresponding to a uplink control channel resource, the same information are sent through corresponding antenna port simultaneously after spread-spectrum by the orthogonal sequence selected according to the resource number of different antenna port. After separating the signals which are from different antenna ports, the receiving end combines and detects the signal to obtain the diversity gain.

FIG. 5 is a schematic diagram of sending diversity gain through SORTD while there are two antenna ports; therein s is ACK/NACK information for feedback, $n_1^{PUCCH}$ and $n_2^{PUCCH}$ represent the orthogonal spread spectrum sequences that corresponding to the resource number of the two different uplink control channel on two antenna ports. UE will feeding back ACK/NACK information on these two feedback channels, so as to realize sending diversity gain of PUCCH.

PUCCH (Physical Uplink Control Channel.

In addition, in LTE-A (Long Term Evolution Advanced) system, the UE in carrier aggregation can transmit PUCCH (Physical Uplink Control Channel) only on one configured uplink main carrier.

In the implementing procedure of the invention, the applicant found at least following problems in present technique:

In multiple-carrier LTE system, while in using carrier aggregation, if each uplink carrier reserves corresponding feedback resource for each downlink carrier, the resources are greatly inefficiently used in uplink carrier, and even result in no available uplink resource for data transmission, which seriously affect the transmission efficiency of system.

Contents of the Invention

The embodiment of the invention has provided a method and a device for determining uplink control channel resources, so as to realize the statically allocating for uplink control channel resources.

To achieve above purpose, the embodiment of the invention has provided a method for allocating uplink control channel resources on one hand, comprising:

The BS recognizing the configured feedback mode of the uplink control information and/or the transmission scheme of the uplink control channel for the terminal equipment;

The said BS sending higher layer signaling to the said terminal equipment according to the recognized results, and allocating uplink control channel resources for the said terminal equipment.

On the other hand, the embodiment of the invention also provides a BS, comprising:

Recognizing Module for recognizing the configured feedback mode of the uplink control information and/or the transmission scheme of the uplink control channel for the terminal equipment;

Allocating Module for sending higher layer signaling to the said terminal equipment based on the recognized results of the said Recognizing Module, and allocating uplink control channel resources for the said terminal equipment.

On the other hand, the embodiment of the invention also provides a method for allocating uplink control channel resources, comprising:

The terminal equipment receiving the higher layer signaling sent by the BS, and the said higher layer signaling carries the information of uplink control channel resource allocated to the said terminal equipment;

The said terminal equipment sending corresponding feedback information to the said BS, according to its own configured feedback mode of the uplink control information and/or the transmission scheme of the uplink control channel, and the received information of uplink control channel resource.

On the other hand, the embodiment of the invention also provides a terminal equipment, comprising:

Configuring Module for configuring the feedback mode of the uplink control information and/or the transmission scheme of the uplink control channel;

Receiving Module for receiving the higher layer signaling sent by the BS, and the said higher layer signaling carriers the information of uplink control channel resource allocated to the said terminal equipment;

Selecting Module for selecting the corresponding uplink control channel resources according to the feedback mode of the uplink control information and/or the transmission scheme of uplink control channel configured by the Configuring Module, and the uplink control channel resource information received by the Receiving Module;

Sending Module for sending the corresponding feedback information to the said BS on the uplink control channel resources selected by the said Selecting Module.

Compared with present technology, the invention has following advantages:

With the technical solutions of the embodiments of the present invention, the uplink control resources, such as the ACK/NACK and the like, can be configured semi-statically. The method is applicable for both the FDD system and the TDD system. The overhead of the uplink feedback channel in the Long Term Evolution (LTE) carrier aggregation system is reduced. Therefore the system performance of the LTE multi-carrier advanced system is improved, and the system is compatible with the LTE Release 8 system well.

CONTENTS OF THE INVENTION

In order to explain the technical program of the present invention more clearly, the following will describe the figures used in the embodiment, obviously, the figure in the following description is only some embodiments of this invention, for the technical personnel in this field, they can also get other figures according to these figures, on the premise of not paying creative labor.

DETAILED DESCRIPTION OF THE EMBODIMENTS OF THE PRESENT INVENTION

Blow the technical proposal of the invention would be described clearly and completely with the figures of the invention, obviously, the embodiments in the following description are only some embodiments of the invention, which are not all the embodiments. According to the embodiments of the invention, all the other embodiments which are obtained by the technical personnel in this field without paying creative labor, are in the protection range of the invention.

For solving the problems in existing techniques, the embodiments of the invention has given a method for determining uplink control channel resources based on the consideration of being compatible with LTE system.

For the multiple carrier LTE system that using spectrum aggregation, the uplink control channel of which can transmit in only one uplink carrier, while UE are receiving data on multiple downlink carrier, there is no certain schema on how to determine the ACK/NACK feedback channel resources that corresponding to each data.

If performing implicit notification according to the method of R8, then, for supporting the asymmetric aggregation of various proportions, the system needs to reserve corresponding feedback resource for each downlink carrier in each uplink carrier, at the same time the resources are greatly inefficiently used in uplink carrier, even result in no available uplink resource for data transmission, which seriously affect the transmission efficiency of system.

Figure 1:
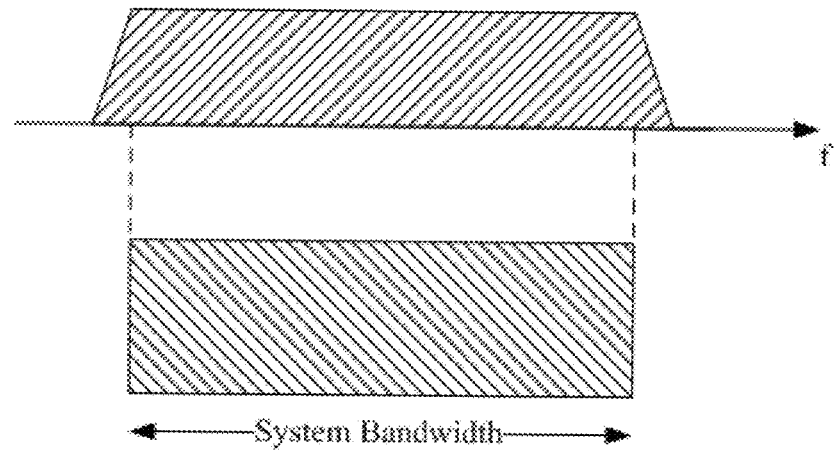
FIG. 1 is the schematic diagram of single frequency spectrum system in present technology.
Figure 2:
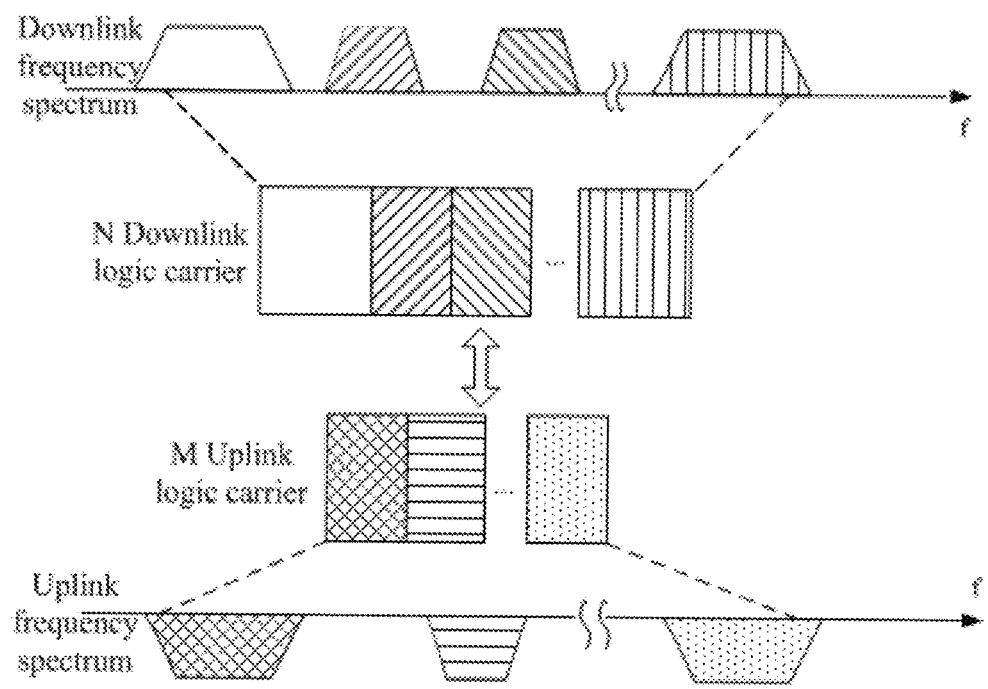
FIG. 2 is the schematic diagram of spectrum aggregation system in present technology.
Figure 3:
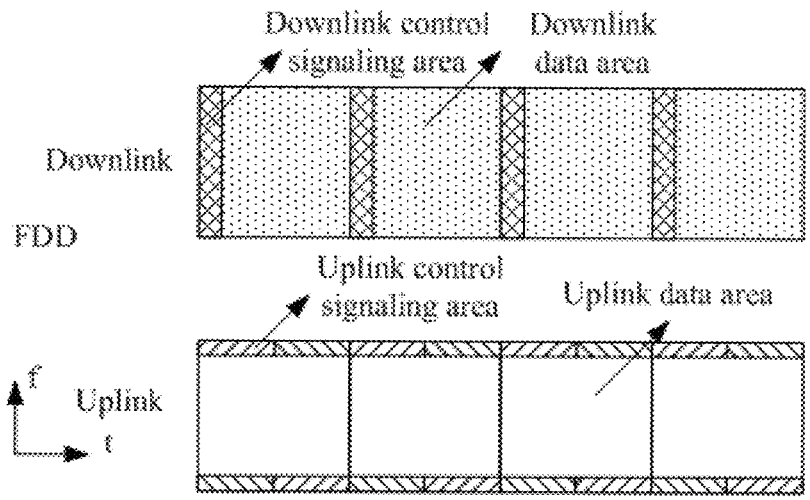
FIG. 3 is the schematic diagram of FDD system in present technology.
Figure 4:
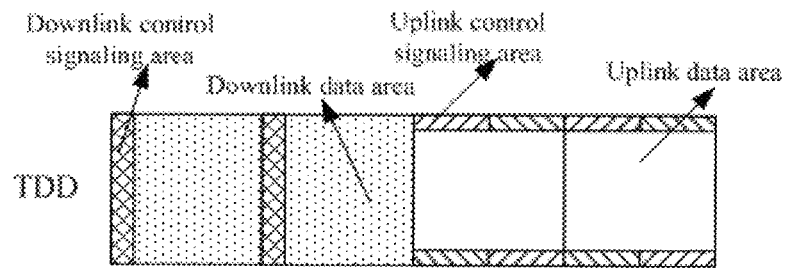
FIG. 4 is the schematic diagram of TDD system in present technology.
Figure 5:
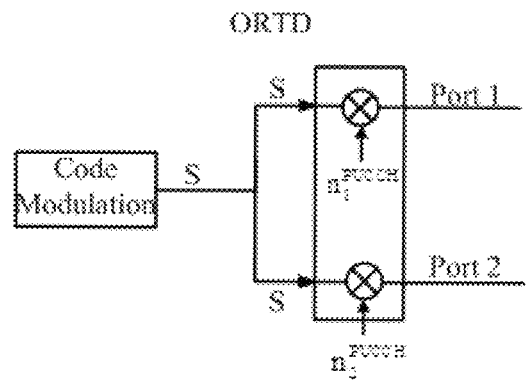
FIG. 5 is the schematic diagram of the two antenna ports sending diversity gain.
Figure 6:
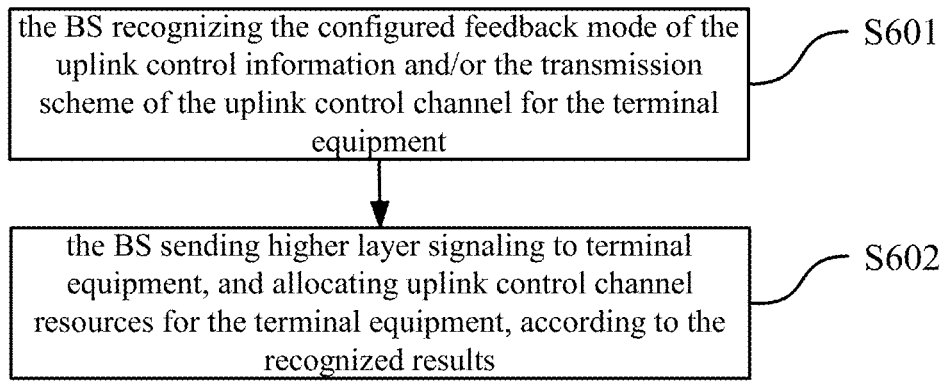
FIG. 6 is the flow diagram of a method for determining uplink control channel resources on BS side, which is provided by the embodiments of the invention.

The invention has given a semi-static resource configuration method, which can lower the number of the control channel resource that reserved in each uplink member carrier, so as to improve the uplink transmission efficiency As is shown in FIG. 6, the flow diagram of a method for determining uplink control channel resources, the method specifically comprising following steps:

Step 601, the BS recognizing the configured feedback mode of the uplink control information and/or the transmission scheme of the uplink control channel for the terminal equipment.

Therein, the feedback mode of the uplink control information and/or the transmission scheme of the uplink control channel configured by the terminal equipment that recognized by the BS, specifically comprising:

Situation 1, the terminal equipment is configured to use the feedback mode of ACK/NACK bundling transmission to feed back ACK/NACK information, and use single antenna port to transmit PUCCH.

Situation 2, the terminal equipment is configured to use the feedback mode of ACK/NACK multiplexing transmission to feed back ACK/NACK information, and use single antenna port to transmit PUCCH.

Situation 3, the terminal equipment is configured to use the feedback mode of ACK/NACK multiplexing transmission to feed back ACK/NACK information, and use the transmit diversity of SORTD to transmit PUCCH.

Situation 4, the terminal equipment is configured to use the feedback mode of ACK/NACK bundling transmission to feed back ACK/NACK information, and use the transmit diversity of SORTD to transmit PUCCH.

In actual application scenarios, which situation is to be adopted depends on the configuration, the BS can adjust and configure which way the terminal equipment adopts according to actual requirement, changes such as these have no affects on the protection range of the invention.

Step 602, the BS sending higher layer signaling to terminal equipment, and allocating uplink control channel resources for the terminal equipment, according to the recognized results.

Corresponding to the recognized results as in the Step 601, the step can be divided into the following four situations:

Situation 1, when the BS recognizes that the terminal equipment is configured to use the feedback mode of ACK/NACK bundling transmission to feed back ACK/NACK information, and use single antenna port to transmit PUCCH, the step specifically comprising:

If the type of present system is FDD system, the BS allocating an uplink control channel resource of PUCCH format 1/1a/1b for terminal equipment.

If the type of present system is TDD system, the BS allocating corresponding number of uplink control channel resources of PUCCH format 1/1a/1b for terminal equipment, according to the default rule.

Situation 2, when the BS recognizes that the terminal equipment is configured to use the feedback mode of ACK/NACK multiplexing transmission to feed back ACK/NACK information, and use single antenna port to transmit PUCCH, the BS needs to recognize the format by which the terminal equipment transmits the multi-bit ACK/NACK information.

When the BS recognizes that the terminal equipment transmits multi-bit ACK/NACK information by PUCCH format 2/2a/2b, the step specifically comprising:

If the type of present system is FDD system, the BS allocating an uplink control channel resource of PUCCH format 2/2a/2b for terminal equipment;

If the type of present system is TDD system, the BS allocating one or more uplink control channel resources of PUCCH format 2/2a/2b for terminal equipment, according to the size of feedback window, the transmission mode of each downlink carrier and the ability information of terminal equipment.

Therein, the multiple downlink carrier and the downlink subframes that needed to perform ACK/NACK feedback in a same subframe, are shortened form "feedback window" in this article.

For FDD system, the size of the feedback window L=the size of the configured downlink carrier set or the number of active carrier in configured downlink carrier set.

For TDD system, the size of feedback window L=N×M, therein, N is the size of the configured downlink carrier set or the number of active carrier in configured downlink carrier set, M is corresponding to the number of the downlink subframes which are feeding back in a same uplink subframe, the value of M is ranged from the different uplink and downlink configuration and uplink subframe, which represent the number of K in each column of Table 1.

On the other hand, when the BS recognizes that the terminal equipment transmits multi-bit ACK/NACK information by PUCCH format 1b with channel selection, the step specifically comprising:

If the type of present system is FDD system, the BS allocating corresponding number of uplink control channel resources of PUCCH format 1/1a/1b for the terminal equipment, according to the size of feedback window and the transmission mode of each downlink carrier;

If the type of present system is TDD system, the BS allocating corresponding number of uplink control channel resources of PUCCH format 1/1a/1b for terminal equipment, according to the default rule.

For situation 3 and situation 4, when the BS recognizes that the terminal equipment is configured to use the transmit diversity of SORTD to transmit PUCCH, the BS sending higher layer signaling to the terminal equipment according to the recognized result, the rules on allocating the uplink control channel resources for terminal equipment is similar to the above situation 1 and situation 2, it is the corresponding number of uplink control channel resource pairs that the BS allocates.

Figure 7:
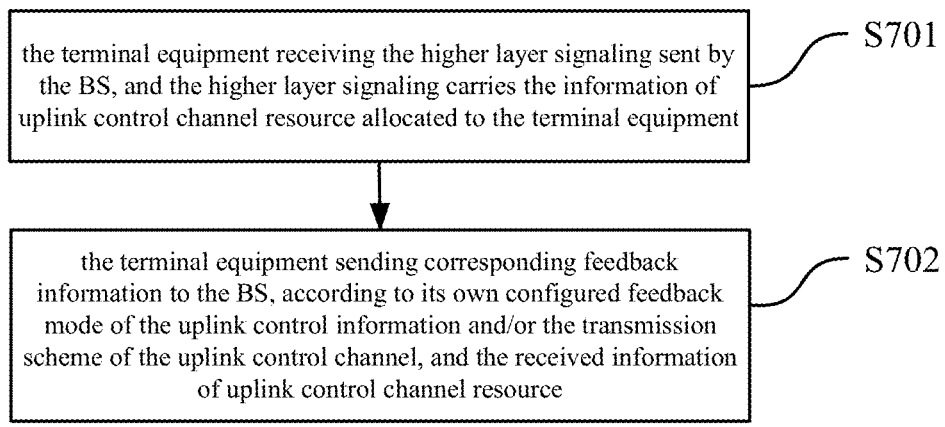
FIG. 7 is the flow diagram of a method for determining uplink control channel resources on terminal equipment side, which is provided by the embodiments of the invention.

The embodiment above has explained the implementations of processing of a method for allocating uplink control channel resources on BS side, correspondingly, the embodiment of the invention has further given the implementations of processing of a method for allocating uplink control channel resources on terminal equipment side, the flow diagram of which is as shown in FIG. 7, comprising following steps:

Step 701, the terminal equipment receiving the higher layer signaling sent by the BS, and the higher layer signaling carries the information of uplink control channel resource allocated to the terminal equipment.

Step 702, the terminal equipment sending corresponding feedback information to the BS, according to its own configured feedback mode of the uplink control information and/or the transmission scheme of the uplink control channel, and the received information of uplink control channel resource.

Therein, the feedback mode of the uplink control information and/or the transmission scheme of the uplink control channel that configured by the terminal are corresponding to the four situations in Step 601, specifically comprising following four types:

Type 1, the terminal equipment is configured to use the feedback mode of ACK/NACK bundling transmission to feed back ACK/NACK information, and use single antenna port to transmit PUCCH.

Type 2, the terminal equipment is configured to use the feedback mode of ACK/NACK multiplexing transmission to feed back ACK/NACK information, and use single antenna port to transmit PUCCH.

Type 3, the terminal equipment is configured to use the feedback mode of ACK/NACK multiplexing transmission to feed back ACK/NACK information, and use the transmit diversity of SORTD to transmit PUCCH.

Type 4, the terminal equipment is configured to use the feedback mode of ACK/NACK bundling transmission to feed back ACK/NACK information, and use the transmit diversity of SORTD to transmit PUCCH.

In actual application scenarios, which type is to be adopted depends on the specific configuration, the BS can adjust and configure which type the terminal equipment adopts according to actual requirement, changes such as these have no affects on the protection range of the invention.

Corresponding to the configuration of each type above, the specific way to handle the step comprising following situations:

Situation 1, corresponding to the above type 1, the terminal equipment is configured to use the feedback mode of ACK/NACK bundling transmission to feed back ACK/NACK information, and use single antenna port to transmit PUCCH.

1. If the type of present system is FDD system, the BS allocating an uplink control channel resource of PUCCH format 1/1a/1b for the terminal equipment, the implement process of the step is as follows:

After bundling the feedback information corresponding to the multiple received data packets, the terminal equipment transmits the bundled feedback information on the uplink control channel resource of PUCCH format 1/1a/1b;

If no data packet is received by the terminal equipment, or missing data packet is ensured, the terminal equipment does not send feedback information to the BS.

2. If the type of present system is TDD system, the BS allocating corresponding number of uplink control channel resources of PUCCH format 1/1a/1a for terminal equipment according to the default rule, the implement process of the step is as follows:

After bundling the feedback information corresponding to the multiple received data packets, the terminal equipment transmits the bundled feedback information on one of the said corresponding number of uplink control channel resources of PUCCH format 1/1a/1b, which corresponding to the last downlink subframe in which actually receiving data transmission;

If no data packet is received by the terminal equipment, or missing data packet is ensured, the terminal equipment does not send feedback information to the BS.

Situation 2, corresponding to the above type 2, the terminal equipment is configured to use the feedback mode of ACK/NACK multiplexing transmission to feed back ACK/NACK information, and use single antenna port to transmit PUCCH.

1. The terminal equipment transmits multi-bit ACK/NACK information by PUCCH format 2/2a/2b.

(1) If the type of present system is FDD system, the BS allocating an uplink control channel resource of PUCCH format 2/2a/2b for the terminal equipment.

After performing joint coding to the feedback information corresponding to the multiple received data packets, the terminal equipment transmits the feedback information on the uplink control channel resource of PUCCH format 2/2a/2b.

(2) If the type of present system is TDD system, the BS allocating one or more uplink control channel resources of PUCCH format 2/2a/2b for the terminal equipment, according to the size of feedback window, the transmission mode of each downlink carrier and the ability information of terminal equipment.

When the power or the uplink transmission capability of the terminal equipment is limited, if the size of feedback information does not exceed the default threshold, after performing joint coding to the feedback information, the terminal equipment transmits the feedback information on one uplink control channel resource of PUCCH format 2/2a/2b, if the size of feedback information exceeds the default threshold, after bundling part of the feedback information and performing joint coding, the terminal equipment transmits the bundled feedback information on the uplink control channel resources of PUCCH format 2/2a/2b;

When the power or the uplink transmission capability of the terminal equipment is not limited, if the size of feedback information does not exceed the default threshold, after performing joint coding to each feedback information, the terminal equipment transmits the feedback information on the multiple uplink control channel resources of PUCCH format 2/2a/2b, if the size of feedback information exceeds the default threshold, after bundling part of the feedback information and performing joint coding, the terminal equipment transmits the bundled feedback information on the uplink control channel resources of PUCCH format 2/2a/2b.

2. The terminal equipment transmits multi-bit ACK/NACK information through PUCCH format 1b with channel selection.

If the type of present system is FDD system, when the number of the information that to be fed back is larger than 4, the terminal equipment first bundling the feedback information corresponding to different codewords on a same downlink carrier, then selecting a corresponding uplink control channel resource from multiple uplink control channel resource of PUCCH format 1/1a/1b and generating the feedback information which is to be transmitted according to the state of feedback information, and transmitting the feedback information which is to be transmitted to the BS.

If the type of present system is TDD system, when the number of the information bits that to be fed back is larger than 4, the terminal equipment first bundling the feedback information corresponding to the data packets of different downlink carriers in a same downlink subframe or bundling the feedback information corresponding to the data packets in different downlink subframes on a same downlink carrier, then selecting a corresponding uplink control channel resource from multiple uplink control channel resource of PUCCH format 1/1a/1b and generating the feedback information which is to be transmitted according to the state of feedback information, and transmitting the feedback information which is to be transmitted to the BS.

Situation 3 and situation 4, corresponding to the above type 3 and type 4, when the terminal equipment is configured to use the transmit diversity of SORTD to transmit PUCCH, the implement process of the step is as follows:

The terminal equipment sending corresponding feedback information to the BS, according to its own configured feedback mode of the uplink control information and/or the transmission scheme of the uplink control channel, and the received information of uplink control channel resource through the corresponding number of uplink control channel resources pairs.

Compared with present technology, the invention has following advantages:

With the technical solutions of the embodiments of the present invention, the uplink control resources, such as the ACK/NACK and the like, can be configured semi-statically. The method is applicable for both the FDD system and the TDD system. The overhead of the uplink feedback channel in the Long Term Evolution (LTE) carrier aggregation system is reduced. Therefore the system performance of the LTE multi-carrier advanced system is improved, and the system is compatible with the LTE Release 8 system well.

Below, the technical schema provided by the embodiment of the invention is explained combing with detail application scene.

For carrier aggregation system, if UE configures to use ACK/NACK bundling mode to perform the feedback of ACK/NACK information, and use single antenna port to transmit PUCCH, then the BS allocating N uplink control channel resources of PUCCH format 1/1a/1b to UE semi-persistently through higher layer signaling:

For FDD system, N=1. After bundling the feedback information corresponding to the multiple received data packets, UE transmits the feedback information on the configured channel; if no data packet is received or data packets missing are found by UE, UE does not send feedback information any more.

For TDD system, N is the maximum of M on a same uplink and downlink configuration in Table 1, the N channel resources are corresponding to different downlink subframes respectively. For example, for uplink and downlink configuration 3, the BS will allocate 3 control channel resources $n_1$, $n_2$, $n_3$ to UE. For uplink subframe n=2, the downlink subframe that corresponding to resource $n_1$ is n−11, the downlink subframe that corresponding to resource $n_2$ is n−7, the downlink subframe that corresponding to resource $n_3$ is n−6; for uplink subframe n=3, the downlink subframe that corresponding to resource $n_1$ is n−6, the downlink subframe that corresponding to resource $n_2$ is n−5, the resource $n_3$ is idle and unused; for uplink subframe n=4, the downlink subframe that corresponding to resource $n_1$ is n−5, the downlink subframe that corresponding to resource $n_2$ is n−4, the resource $n_3$ is idle and unused. After bundling the feedback information corresponding to multiple received data packets, the UE transmits the feedback information on the uplink control channel resource, which is corresponding to the last downlink subframe that exists data transmission actually; if no data packet is received or data packets missing are found by UE, UE does not send feedback information any more.

The specific allocating number is shown in Table 2:

TABLE 2

The quantity sheet for allocating control channel resources

| UL-DL Configuration | N |
|---|---|
| 0 | 1 |
| 1 | 2 |
| 2 | 4 |
| 3 | 3 |
| 4 | 4 |
| 5 | 9 |
| 6 | 1 |

For carrier aggregation system, if the configuration of UE uses ACK/NACK multiplexing mode to perform the feedback of ACK/NACK information, and use single antenna port to transmit PUCCH, then the BS allocating uplink control resource to UE semi-persistently through higher layer signaling:

If the format of PUCCH format 2/2a/2b is used to transmit multi-bit ACK/NACK information, then the corresponding process is as follows:

For FDD system, the higher layer allocates an uplink control channel resource of PUCCH format 2/2a/2b to UE semi-persistently through higher layer signaling. After performing joint coding to all the feedback information, the UE transmits the feedback information on the configured channel.

For TDD system, the higher layer allocating one or more uplink control channel resources of PUCCH format 2/2a/2b semi-persistently for UE, according to the size L of feedback window, the transmission mode of each downlink carrier and the ability of UE. After performing joint coding to the feedback information, the UE transmits the feedback information on the configured channel.

When the power or the uplink transmission capability of UE is limited (only one PUCCH can be transmitted), the higher layer will allocate an uplink control channel resource of PUCCH format 2/2a/2b for UE. When the number of the ACK/NACK information that to be fed back is larger than 13 bits, then part of the ACK/NACK information will be bundling, therein, while transmitting by single codewords, P=L, while transmitting by multiple codewords, P=2×L.

When the power or the uplink transmission capability of UE is not limited (Q PUCCH can be transmitted, Q>1), and the number P of the ACK/NACK information which to be fed back is large than 13 bits, higher layer can configure N uplink control channel resources of PUCCH format 2/2a/2b according to the specific condition of UE, N=min($\lceil P/13 \rceil$,Q). When P>N×13, part of the ACK/NACK information will be bundling, therein, while transmitting by single codewords, P=L, while transmitting by multiple codewords, P=2×L.

If PUCCH format 1b with channel selection is used to transmit multiple bits ACK/NACK information, then the corresponding process is as follows:

For FDD system, the higher layer allocating N uplink control channel resources of PUCCH format 1/1a/1b to UE semi-persistently.

Therein, N=the size of feedback window, the N channel resources are corresponding to the different downlink carrier respectively, UE bundling the ACK/NACK information which corresponding to the different codewords of a same downlink carrier, generating N bundling ACK/NACK feedback information; or $$N = \sum_{l=0}^{L-1} C_l,$$

therein $C_l$ is the number of codewords in carrier l, the N channel resources are corresponding to the different codewords of different downlink carrier. The UE according to the specific condition of the information which to be fed back, looking up the table and determining the information actually transmitted and the channel used (one of the N configured channel).

For TDD system, higher layer allocates N uplink control channel resources of PUCCH format 1/1a/1b to UE semi-persistently.

Therein, N=the maximum of M on a same uplink and downlink configuration of Table 1, the corresponding relationship is as pervious, UE bundling the ACK/NACK information corresponding to the data packets on the different downlink carrier of a same downlink subframe; or $$N = \sum_{l=0}^{L-1} C_l,$$

therein $C_l$ is the number of codewords in carrier l, the N channel resources are corresponding to the different codewords of different downlink carrier respectively; or C≤N≤4, therein C is the number of the downlink carrier which are configured. UE bundling the ACK/NACK information in the different subframes of a same downlink carrier, generating N bit information which to be fed back, the N channel resources are corresponding to the different information which to be fed back respectively.

The UE according to the specific condition of the information which to be fed back, looking up the table and determining the information actually transmitted and the channel used (one of the N configured channel).

For carrier aggregation system, if the configuration of UE uses SORTD to perform transmitting diversity and sending PUCCH, the BS allocating uplink control resources pair for UE semi-persistently through higher layer signaling. The way of allocating is familiar with that in article, the difference between the two is: the number of the resources configured by the $BSN_{SORTD}=2\times N$, therein N is the number of the configured channel resources while transmitting by single antenna ports and under the same feedback mode. $N_{SORTD}$ channel resources have been divided into N pairs, each resource pair comprises 2 channel resources, UE will send PUCCH on the 2 channel of a same resource pair simultaneously. As it explained in previous example, for uplink and downlink configuration 3, while using SORTD to perform transmitting diversity and sending PUCCH, the BS will allocate 3 control channel resources pairs $(n_1, n_2)$, $(n_3, n_4)$, $(n_5, n_6)$. For uplink subframe n=2, the downlink subframe corresponding to the resource pair $(n_1, n_2)$ is n−11, the downlink subframe corresponding to the resource pair $(n_3, n_4)$ is n−7, the downlink subframe corresponding to the resource pair $(n_5, n_6)$ is n−6; for uplink subframe n=3, the downlink subframe corresponding to the resource pair $(n_1, n_2)$ is n−6, the downlink subframe corresponding to the resource pair $(n_3, n_4)$ is n−5, the resource pair $(n_5, n_6)$ is free and unused; for uplink subframe n=4, the downlink subframe corresponding to the resource pair $(n_1, n_2)$ is n−5, the downlink subframe corresponding to the resource pair $(n_3, n_4)$ is n−4, the resource pair $(n_5, n_6)$ is free and unused. After bundling the feedback information corresponding to the multiple received data packets, UE transmits the feedback information on the 2 channel of the uplink control channel resources which corresponding to the last downlink subframe that exists actual data transmission; if no data packet is received or data packets missing are found by UE, UE does not send feedback information any more.

To ensure to be compatible with R8 system, each uplink carrier according to the implicitly notification of R8, always reserve the uplink control channel resource that corresponding to the downlink carrier, which is paired with the uplink carrier. When there is no PDCCH for downlink dynamic scheduling in the downlink carrier that corresponding to the uplink PUCCH main carrier, UE only can use the channel resource configured by higher layer to transmit PUCCH. When there is PDCCH for downlink dynamic scheduling in the downlink carrier that corresponding to the uplink PUCCH main carrier, except the channel resource configured by higher layer, UE can also according to the uplink control channel resource, which can transmit PUCCH format 1/1a/1b and configured based on the implicitly notification of R8, at present:

UE fixedly using the channel resource configured by higher layer to perform the feedback of ACK/NACK information as previous methods;

Or, for ACK/NACK bundling mode and PUCCH format 1b with channel selection, the data packets which has the resource corresponding to PDCCH use the uplink channel resource that corresponding to PDCCH, for the data packets which has no resource corresponding to PDCCH, the channel resource configured by higher layer will be used and performing the feedback of ACK/NACK information as previous methods.

Compared with present technology, the embodiment of the invention has following advantages:

With the technical solutions of the embodiments of the present invention, the uplink control resources, such as the ACK/NACK and the like, can be configured statically. The method is applicable for both the FDD system and the TDD system. The overhead of the uplink feedback channel in the Long Term Evolution (LTE) carrier aggregation system is reduced. Therefore the system performance of the LTE multi-carrier advanced system is improved, and the system is compatible with the LTE Release 8 system well.

Figure 8:
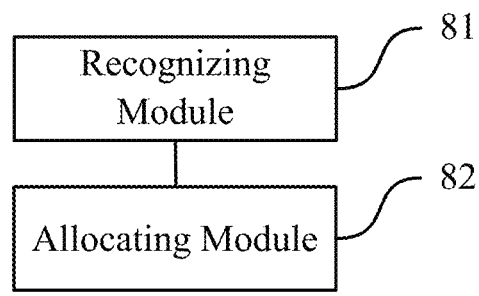
FIG. 8 is the structure diagram of a BS provided by the embodiments of the invention.

To realize the technical schema of the embodiment of the invention, the embodiment of the invention also provides a BS, and the structure diagram of which is as shown in FIG. 8, specifically comprising:

Recognizing Module 81 for recognizing the configured feedback mode of the uplink control information and/or the transmission scheme of the uplink control channel for the terminal equipment;

Allocating Module 82 for sending higher layer signaling to the terminal equipment based on the recognized results of Recognizing Module 81, and allocating uplink control channel resources for the terminal equipment.

Preferably, the Recognizing Module 81 recognizes the configured feedback mode of the uplink control information and/or the transmission scheme of the uplink control channel for the terminal equipment, specifically comprising:

The terminal equipment is configured to use the feedback mode of ACK/NACK bundling transmission to feed back ACK/NACK information, and use single antenna port to transmit PUCCH; or, The terminal equipment is configured to use the feedback mode of ACK/NACK multiplexing transmission to feed back ACK/NACK information, and use single antenna port to transmit PUCCH; or, The terminal equipment is configured to use the feedback mode of ACK/NACK multiplexing transmission to feed back ACK/NACK information, and use the transmit diversity of SORTD to transmit PUCCH; or, The terminal equipment is configured to use the feedback mode of ACK/NACK bundling transmission to feed back ACK/NACK information, and use the transmit diversity of SORTD to transmit PUCCH.

Preferably, when the Recognizing Module 81 recognizes that the terminal equipment is configured to use the feedback mode of ACK/NACK bundling transmission to feed back ACK/NACK information, and use single antenna port to transmit PUCCH, the Allocating Module 82 sending higher layer signaling to the terminal equipment based on the recognized results of Recognizing Module 81, and allocating uplink control channel resources for the terminal equipment, comprising:

If the type of present system is FDD system, the Allocating Module 82 allocating an uplink control channel resource of PUCCH format 1/1a/1b for terminal equipment;

If the type of present system is TDD system, the Allocating Module 82 allocating corresponding number of uplink control channel resources of PUCCH format 1/1a/1b for terminal equipment, according to the default rule.

Preferably, when the Recognizing Module 81 recognizes that the terminal equipment is configured to use the feedback mode of ACK/NACK multiplexing transmission to feed back ACK/NACK information, and use single antenna port to transmit PUCCH, the Recognizing Module 81 also recognizes the format by which the terminal equipment transmits multi-bit ACK/NACK information, the Allocating Module 82 for sending higher layer signaling to the terminal equipment based on the recognized results of Recognizing Module 81, and allocating uplink control channel resources for the terminal equipment, comprising:

When the Recognizing Module 81 recognizes that the terminal equipment transmits multi-bit ACK/NACK information by PUCCH format 2/2a/2b, if the type of present system is FDD system, the Allocating Module 82 allocating an uplink control channel resource of PUCCH format 2/2a/2b for terminal equipment, if the type of present system is TDD system, the Allocating Module 82 allocating one or more uplink control channel resources of PUCCH format 2/2a/2b for the terminal equipment, according to the size of feedback window, the transmission mode of each downlink carrier and the ability information of terminal equipment;

When the Recognizing Module 81 recognizes that the terminal equipment transmits multi-bit ACK/NACK information through PUCCH format 1b with channel selection, if the type of present system is FDD system, the Allocating Module 82 allocating corresponding number of uplink control channel resources of PUCCH format 1/1a/1b for the terminal equipment, according to the size of feedback window, and the transmission mode of each downlink carrier, if the type of present system is TDD system, the Allocating Module 82 allocating corresponding number of uplink control channel resources of PUCCH format 1/1a/1b for the terminal equipment, according to the default rule.

Preferably, when the Recognizing Module 81 recognizes that the terminal equipment is configured to use the transmit diversity of SORTD to transmit PUCCH, the Allocating Module 82 sending higher layer signaling to the terminal equipment and allocating uplink control channel resources for the terminal equipment, specifically comprising:

The Allocating Module 82 allocating corresponding number of uplink control channel resource pairs for terminal equipment.

Figure 9:
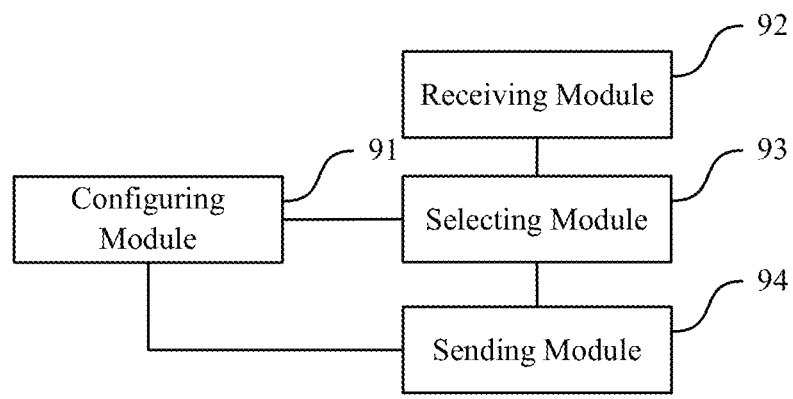
FIG. 9 is the structure diagram of a terminal equipment provided by the embodiments of the invention.

On the other side, the embodiments of the invention also provide terminal equipment, the structure diagram of which is as shown in FIG. 9, specifically comprising:

Configuring Module 91 for configuring the feedback mode of the uplink control information and/or the transmission scheme of the uplink control channel;

Therein, the feedback mode of the uplink control information and/or the transmission scheme of the uplink control channel configured by the Configuring Module 91, specifically comprising:

The terminal equipment is configured to use the feedback mode of ACK/NACK bundling transmission to feed back ACK/NACK information, and use single antenna port to transmit PUCCH; or, The terminal equipment is configured to use the feedback mode of ACK/NACK multiplexing transmission to feed back ACK/NACK information, and use single antenna port to transmit PUCCH The terminal equipment is configured to use the feedback mode of ACK/NACK multiplexing transmission to feed back ACK/NACK information, and use the transmit diversity of SORTD to transmit PUCCH; or, The terminal equipment is configured to use the feedback mode of ACK/NACK bundling transmission to feed back ACK/NACK information, and use the transmit diversity of SORTD to transmit PUCCH.

Receiving Module 92 for receiving the higher layer signaling sent by the BS, and the higher layer signaling carriers the information of uplink control channel resource allocated to the terminal equipment;

Selecting Module 93 for selecting the corresponding uplink control channel resources according to the feedback mode of the uplink control channel information and/or the transmission scheme of uplink control channel configured by the Configuring Module 91, and the uplink control channel resource information received by the Receiving Module 92.

Sending Module 94 for sending the corresponding feedback information to the BS on the uplink control channel resources selected by the Selecting Module 93.

Corresponding to the feedback mode and/or the transmission schema configured by the Configuring Module 91, the subsequent process comprises following situations:

Situation 1, when the terminal equipment is configured to use the feedback mode of ACK/NACK bundling transmission to feed back ACK/NACK information, and use single antenna port to transmit PUCCH, specifically comprising:

If the type of present system is FDD system, the BS allocating an uplink control channel resource of PUCCH format 1/1a/1b for terminal equipment, after bundling the feedback information corresponding to the multiple received data packets, the Sending Module 94 transmits the bundled feedback information on the uplink control channel resource of PUCCH format 1/1a/1b, if no data packet is received by the terminal equipment, or missing data packet is ensured, the terminal equipment does not send feedback information to the BS;

If the type of present system is TDD system, the BS allocating corresponding number of uplink control channel resources of PUCCH format 1/1a/1b for the terminal equipment according to the default rule, after bundling the feedback information corresponding to the multiple received data packets, the Sending Module 94 transmits the bundled feedback information on one of the said corresponding number of uplink control channel resources of PUCCH format 1/1a/1b, which corresponding to the last downlink subframe that actually receiving data transmission, selected by the Selecting Module 93, if no data packet is received by the terminal equipment, or missing data packet is ensured, the terminal equipment does not send feedback information to the BS.

Situation 2, when the terminal equipment is configured to use the feedback mode of ACK/NACK multiplexing transmission to feed back ACK/NACK information, and use single antenna port to transmit PUCCH, 1. The Configuring Module 91 transmitting multi-bit ACK/NACK information by PUCCH format 2/2a/2b, If the type of present system is FDD system, the BS allocating an uplink control channel resource of PUCCH format 2/2a/2b for terminal equipment, after performing joint coding to the feedback information corresponding to the multiple received data packets, the terminal equipment transmits the feedback information on the uplink control channel resource of PUCCH format 2/2a/2b;

If the type of present system is TDD system, the BS allocating one or more uplink control channel resources of PUCCH format 2/2a/2b for the terminal equipment, according to the size of feedback window, the transmission mode of each downlink carrier and the ability information of terminal equipment, when the power or the uplink transmission capability of the terminal equipment is limited, if the size of feedback information does not exceed the default threshold, after performing joint coding to the feedback information, the terminal equipment transmits the feedback information on one uplink control channel resource of PUCCH format 2/2a/2b, if the size of feedback information exceeds the default threshold, after bundling part of the feedback information and performing joint coding, the Sending Module 94 transmits the bundled feedback information on one uplink control channel resource of PUCCH format 2/2a/2b, when the power or the uplink transmission capability of the terminal equipment is not limited, if the size of feedback information does not exceed the default threshold, after performing joint coding to each feedback information, the Sending Module 94 transmits the feedback information on the multiple uplink control channel resource of PUCCH format 2/2a/2b, if the size of feedback information exceeds the default threshold, after bundling part of the feedback information and performing joint coding, the Sending Module 94 transmits the bundled feedback information on the uplink control channel resource of PUCCH format 2/2a/2b.

2. The terminal equipment sending multi-bit ACK/NACK information through PUCCH format 1b with channel selection, If the type of present system is FDD system, when the number of the information that to be fed back is larger than 4, the Sending Module 94 first combine the feedback information corresponding to different codewords on a same downlink carrier, then selecting a corresponding uplink control channel resource from multiple uplink control channel resources of PUCCH format 1/1a/1b and generating the feedback information which is to be transmitted according to the state of feedback information, and transmitting the feedback information which is to be transmitted to the BS;

If the type of present system is TDD system, when the number of the information bits that to be fed back is larger than 4, the terminal equipment first bundling the feedback information corresponding to the data packets in different downlink carriers in a same downlink subframe or bundling the feedback information corresponding to the data packets in different downlink subframes on a same downlink carrier, then selecting a corresponding uplink control channel resource from multiple uplink control channel resource of PUCCH format 1/1a/1b and generating the feedback information which is to be transmitted according to the state of feedback information, and transmitting the feedback information which is to be transmitted to the said BS.

Situation 3 and Situation 4, when the Configuring Module 91 is configured to use the transmit diversity of SORTD to transmit PUCCH, The Sending Module 94 sending corresponding feedback information to the BS, according to the feedback mode of the uplink control information of Configuring Module 91 and/or the transmission scheme of the uplink control channel, and the received information of uplink control channel resource through the corresponding number of uplink control channel resources pairs.

Compared with present technology, the embodiments of the invention have following advantages:

With the technical solutions of the embodiments of the present invention, the uplink control resources, such as the ACK/NACK and the like, can be configured semi-statically. The method is applicable for both the FDD system and the TDD system. The overhead of the uplink feedback channel in the Long Term Evolution (LTE) carrier aggregation system is reduced. Therefore the system performance of the LTE multi-carrier advanced system is improved, and the system is compatible with the LTE Release 8 system well.

Through the description of the embodiments above, the technical personnel in this field can understand clearly that the present invention can be implemented by hardware or software and necessary current hardware platform. Based on this understanding, the technical program of the present invention can be embodied by a form of software products which can be stored in a nonvolatile storage medium (such as CD-ROM, U disk, mobile hard disk, etc.), including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be bundling into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

CONCEPTS

1. A method for allocating uplink control channel resources, wherein, comprising:

The BS recognizing the configured feedback mode of the uplink control information and/or the transmission scheme of the uplink control channel for the terminal equipment;

The said BS sending higher layer signaling to the said terminal equipment according to the recognized results, and allocating uplink control channel resources for the said terminal equipment.

2. The method as in claim 1, wherein, the feedback mode of the uplink control information and/or the transmission scheme of the uplink control channel configured to the said terminal equipment that recognized by the said BS, specifically comprising:

The said terminal equipment is configured to use the feedback mode of ACK/NACK bundling transmission to feed back ACK/NACK information, and use single antenna port to transmit PUCCH; or, The said terminal equipment is configured to use the feedback mode of ACK/NACK multiplexing transmission to feed back ACK/NACK information, and use single antenna port to transmit PUCCH; or, The said terminal equipment is configured to use the feedback mode of ACK/NACK multiplexing transmission to feed back ACK/NACK information, and use the transmit diversity of SORTD to transmit PUCCH; or, The terminal equipment is configured to use the feedback mode of ACK/NACK bundling transmission to feed back ACK/NACK information, and use the transmit diversity of SORTD to transmit PUCCH.

3. The method as in concept 2, wherein, when the said BS recognizes that the said terminal equipment is configured to use the feedback mode of ACK/NACK bundling transmission to feed back ACK/NACK information, and use single antenna port to transmit PUCCH, the said BS sending higher layer signaling to the said terminal equipment and allocating uplink control channel resources for the said terminal equipment, according to the said recognized results, specifically comprising:

If the type of present system is FDD system, the said BS allocating an uplink control channel resource of PUCCH format 1/1a/1b for the said terminal equipment;

If the type of present system is TDD system, the said BS allocating corresponding number of uplink control channel resources of PUCCH format 1/1a/1b for the said terminal equipment, according to the default rule.

4. The method as in concept 2, wherein, when the said BS recognizes that the said terminal equipment is configured to use the feedback mode of ACK/NACK multiplexing transmission to feed back ACK/NACK information, and use single antenna port to transmit PUCCH, the said BS sending higher layer signaling to the said terminal equipment, and allocating uplink control channel resources for the said terminal equipment, according to the said recognized results, specifically comprising:

The said BS recognizing the format by which the said terminal equipment transmits the multi-bit ACK/NACK information.

5. The method as in concept 4, wherein, when the said BS recognizes that the said terminal equipment transmits multi-bit ACK/NACK information by PUCCH format 2/2a/2b, the said method further comprising:

If the type of present system is FDD system, the said BS allocating an uplink control channel resource of PUCCH format 2/2a/2b for the said terminal equipment;

If the type of present system is TDD system, the said BS allocating one or more uplink control channel resources of PUCCH format 2/2a/2b for the said terminal equipment, according to the size of feedback window, the transmission mode of each downlink carrier and the capability information of terminal equipment.

6. The method as in concept 4, wherein, when the said BS recognizes that the said terminal equipment transmits multi-bit ACK/NACK information by PUCCH format 1b with channel selection, the step further comprising:

If the type of present system is FDD system, the said BS allocating corresponding number of uplink control channel resources of PUCCH format 1/1a/1b for the said terminal equipment, according to the size of feedback window and the transmission mode of each downlink carrier;

If the type of present system is TDD system, the BS allocating corresponding number of uplink control channel resources of PUCCH format 1/1a/1b for terminal equipment, according to the default rule.

7. The method as in any concept 3 to concept 6, wherein, when the said BS recognizes that the said terminal equipment is configured to use the transmit diversity of SORTD to transmit PUCCH, the said BS sending higher layer signaling to the said terminal equipment, and allocating uplink control channel resource for the said terminal equipment, according to the recognized result, specifically comprising:

The said BS allocating corresponding number of uplink control channel resource pairs for the said terminal equipment.

8. A BS, wherein, comprising:

Recognizing Module for recognizing the configured feedback mode of the uplink control information and/or the transmission scheme of the uplink control channel for the terminal equipment;

Allocating Module for sending higher layer signaling to the said terminal equipment based on the recognized results of the said Recognizing Module, and allocating uplink control channel resources for the said terminal equipment.

9. The BS as in concept 8, wherein, the said Recognizing Module recognizes the configured feedback mode of the uplink control information and/or the transmission scheme of the uplink control channel for the said terminal equipment, specifically comprising:

The said terminal equipment is configured to use the feedback mode of ACK/NACK bundling transmission to feed back ACK/NACK information, and use single antenna port to transmit PUCCH; or, The terminal equipment is configured to use the feedback mode of ACK/NACK multiplexing transmission to feed back ACK/NACK information, and use single antenna port to transmit PUCCH; or, The terminal equipment is configured to use the feedback mode of ACK/NACK multiplexing transmission to feed back ACK/NACK information, and use the transmit diversity of SORTD to transmit PUCCH; or, The terminal equipment is configured to use the feedback mode of ACK/NACK bundling transmission to feed back ACK/NACK information, and use the transmit diversity of SORTD to transmit PUCCH 10. The BS as in concept 9, wherein, when the said Recognizing Module recognizes that the said terminal equipment is configured to use the feedback mode of ACK/NACK bundling transmission to feed back ACK/NACK information, and use single antenna port to transmit PUCCH, the said Allocating Module sending higher layer signaling to the terminal equipment based on the recognized results of the said Recognizing Module, and allocating uplink control channel resources for the said terminal equipment, comprising:

If the type of present system is FDD system, the said Allocating Module allocating a uplink control channel resource of PUCCH format 1/1a/1b for the said terminal equipment;

If the type of present system is TDD system, the said Allocating Module allocating corresponding number of uplink control channel resources of PUCCH format 1/1a/1b for the said terminal equipment, according to the default rule.

11. The BS as in concept 9, wherein, when the said Recognizing Module recognizes that the said terminal equipment is configured to use the feedback mode of ACK/NACK multiplexing transmission to feed back ACK/NACK information, and use single antenna port to transmit PUCCH, and the said Recognizing Module also recognizes the format by which the terminal equipment transmits multi-bit ACK/NACK information, the said Allocating Module for sending higher layer signaling to the terminal equipment based on the recognized results of the said Recognizing Module, and allocating uplink control channel resources for the said terminal equipment, comprising:

When the said Recognizing Module recognizes that the said terminal equipment transmits multi-bit ACK/NACK information by PUCCH format 2/2a/2b, if the type of present system is FDD system, the said Allocating Module allocating an uplink control channel resource of PUCCH format 2/2a/2b for the said terminal equipment; if the type of present system is TDD system, the said Allocating Module allocating one or more uplink control channel resources of PUCCH format 2/2a/2b for the said terminal equipment, according to the size of feedback window, the transmission mode of each downlink carrier and the capability information of terminal equipment;

When the said Recognizing Module recognizes that the said terminal equipment transmits multi-bit ACK/NACK information by PUCCH format 1b with channel selection, if the type of present system is FDD system, the said Allocating Module allocating corresponding number of uplink control channel resources of PUCCH format 1/1a/1b for the said terminal equipment, according to the size of feedback window and the transmission mode of each downlink carrier; if the type of present system is TDD system, the said Allocating Module allocating corresponding number of uplink control channel resources of PUCCH format 1/1a/1b for the said terminal equipment, according to the default rule.

12. The BS as in concept 10 or 11, wherein, when the said Recognizing Module recognizes that the said terminal equipment is configured to use the transmit diversity of SORTD to transmit PUCCH, the said Allocating Module sending higher layer signaling to the said terminal equipment and allocating uplink control channel resources for the said terminal equipment, specifically comprising:

The said Allocating Module allocating corresponding number of uplink control channel resource pairs for the said terminal equipment.

13. A method for allocating uplink control channel resources, wherein, comprising:

The terminal equipment receiving the higher layer signaling sent by the BS, and the said higher layer signaling carries the information of uplink control channel resource allocated to the said terminal equipment;

The said terminal equipment sending corresponding feedback information to the said BS, according to its own configured feedback mode of the uplink control information and/or the transmission scheme of the uplink control channel, and the received information of uplink control channel resource.

14. The method as in concept 13, wherein, the configured feedback mode of the uplink control information and/or the transmission scheme of the uplink control channel for the said terminal, specifically comprising:

The said terminal equipment is configured to use the feedback mode of ACK/NACK bundling transmission to feed back ACK/NACK information, and use single antenna port to transmit PUCCH; or, The said terminal equipment is configured to use the feedback mode of ACK/NACK multiplexing transmission to feed back ACK/NACK information, and use single antenna port to transmit PUCCH; or, The said terminal equipment is configured to use the feedback mode of ACK/NACK multiplexing transmission to feed back ACK/NACK information, and use the transmit diversity of SORTD to transmit PUCCH; or, The said terminal equipment is configured to use the feedback mode of ACK/NACK bundling transmission to feed back ACK/NACK information, and use the transmit diversity of SORTD to transmit PUCCH.

15. The method as in concept 14, wherein, when the said terminal equipment is configured to use the feedback mode of ACK/NACK bundling transmission to feed back ACK/NACK information, and use single antenna port to transmit PUCCH, the uplink control channel resource information received by the said terminal equipment and carried by the higher layer signaling which sent by the said BS, specifically comprising:

If the type of present system is FDD system, the said BS allocating an uplink control channel resource of PUCCH format 1/1a/1b for the said terminal equipment;

If the type of present system is TDD system, the said BS allocating corresponding number of uplink control channel resources of PUCCH format 1/1a/1b for the said terminal equipment, according to the default rule.

16. The method as in concept 15, wherein, if the said uplink control channel resource information is an uplink control channel resource of PUCCH format 1/1a/1b, the said terminal equipment sending corresponding feedback information to the said BS, according to its own configured feedback mode of the uplink control information and/or the transmission scheme of the uplink control channel, and the received information of uplink control channel resource, comprising:

After bundling the feedback information corresponding to the multiple received data packets, the said terminal equipment transmits the said bundled feedback information on the said uplink control channel resource of PUCCH format 1/1a/1b;

If no data packet is received by the terminal equipment, or missing data packet is ensured, the said terminal equipment does not send feedback information to the said BS.

17. The method as in concept 15, wherein, if the said uplink control channel resource information is the corresponding number of uplink control channel resources of PUCCH format 1/1a/1b, the said terminal equipment sending corresponding feedback information to the said BS, according to its own configured feedback mode of the uplink control information and/or the transmission scheme of the uplink control channel, and the received information of uplink control channel resource, comprising:

After bundling the feedback information corresponding to the multiple received data packets, the said terminal equipment transmits the said bundled feedback information on one of the said corresponding number of uplink control channel resources of PUCCH format 1/1a/1b, which corresponding to the last downlink subframe in which actually receiving data transmission;

If no data packet is received by the terminal equipment, or missing data packet is ensured, the said terminal equipment does not send feedback information to the BS.

18. The method as in concept 14, wherein, when the said terminal equipment is configured to use the feedback mode of ACK/NACK multiplexing transmission to feed back ACK/NACK information, and use single antenna port to transmit PUCCH, and if the said terminal equipment transmits multi-bit ACK/NACK information by PUCCH format 2/2a/2b, the uplink control channel resource information received by the said terminal equipment and carried by the higher layer signaling which sent by the said BS, specifically comprising:

If the type of present system is FDD system, the said BS allocating an uplink control channel resource of PUCCH format 2/2a/2b for the said terminal equipment;

If the type of present system is TDD system, the said BS allocating one or more uplink control channel resources of PUCCH format 2/2a/2b for the said terminal equipment, according to the size of feedback window, the transmission mode of each downlink carrier and the capability information of terminal equipment.

19. The method as in concept 18, wherein, if the said uplink control channel resource information is an uplink control channel resource of PUCCH format 2/2a/2b, the said terminal equipment sending corresponding feedback information to the said BS, according to its own configured feedback mode of the uplink control information and/or the transmission scheme of the uplink control channel, and the received information of uplink control channel resource, comprising:

After performing joint coding to the feedback information corresponding to the multiple received data packets, the said terminal equipment transmits the feedback information on the said uplink control channel resource of PUCCH format 2/2a/2b.

20. The method as in concept 18, wherein, if the said uplink control channel resource information is one or more uplink control channel resources of PUCCH format 2/2a/2b, the said terminal equipment sending corresponding feedback information to the said BS, according to its own configured feedback mode of the uplink control information and/or the transmission scheme of the uplink control channel, and the received information of uplink control channel resource, comprising:

When the power or the uplink transmission capability of the said terminal equipment is limited, if the size of feedback information does not exceed the default threshold, after performing joint coding to the feedback information, the said terminal equipment transmits the said feedback information on one uplink control channel resource of PUCCH format 2/2a/2b; if the size of feedback information exceeds the default threshold, after bundling part of the feedback information and performing joint coding, the said terminal equipment transmits the said bundled feedback information on one uplink control channel resource of PUCCH format 2/2a/2b;

When the power or the uplink transmission capability of the said terminal equipment is not limited, if the size of feedback information does not exceed the default threshold, after performing joint coding to each feedback information, the said terminal equipment transmits the said feedback information on multiple uplink control channel resources of PUCCH format 2/2a/2b; if the size of feedback information exceeds the default threshold, after bundling part of the feedback information and performing joint coding, the terminal equipment transmits the said bundled feedback information on multiple uplink control channel resources of PUCCH format 2/2a/2b.

21. The method as in concept 14, wherein, when the said terminal equipment is configured to use the feedback mode of ACK/NACK multiplexing transmission to feed back ACK/NACK information, and use single antenna port to transmit PUCCH, and if the said terminal equipment transmits multi-bit ACK/NACK information by PUCCH format 1b with channel selection, the said terminal equipment sending corresponding feedback information to the said BS, according to its own configured feedback mode of the uplink control information and/or the transmission scheme of the uplink control channel, and the received information of uplink control channel resource, comprising:

If the type of present system is FDD system, when the number of ACK/NACK bits is larger than 4, the said terminal equipment first bundling the feedback information corresponding to different codewords on a same downlink carrier, then selecting a corresponding uplink control channel resource from multiple uplink control channel resources of PUCCH format 1/1a/1b and generating the feedback information which is to be transmitted according to the state of feedback information, and transmitting the said feedback information which is to be transmitted to the said BS;

If the type of present system is TDD system, when the number of ACK/NACK bits is larger than 4, the said terminal equipment first bundling the feedback information corresponding to the data packets on different downlink carriers in a same downlink subframe or bundling the feedback information corresponding to the data packets in different downlink subframes on a same downlink carrier, then selecting a corresponding uplink control channel resources from multiple uplink control channel resources of PUCCH format 1/1a/1b and generating the feedback information which is to be transmitted according to the state of feedback information, and transmitting the said feedback information which is to be transmitted to the said BS.

22. The method as in any concept 15 to 21, wherein, when the said terminal equipment is configured to use the transmit diversity of SORTD to transmit PUCCH, the said terminal equipment sending corresponding feedback information to the said BS, according to its own configured feedback mode of the uplink control information and/or the transmission scheme of the uplink control channel, and the received information of uplink control channel resource, specifically comprising:

The said terminal equipment sending corresponding feedback information to the said BS through the corresponding number of uplink control channel resources pairs, according to its own configured feedback mode of the uplink control information and/or the transmission scheme of the uplink control channel, and the received information of uplink control channel resource.

23. A terminal equipment, wherein, comprising:

Configuring Module for configuring the feedback mode of the uplink control information and/or the transmission scheme of the uplink control channel;

Receiving Module for receiving the higher layer signaling sent by the BS, and the said higher layer signaling carriers the information of uplink control channel resource allocated to the said terminal equipment;

Selecting Module for selecting the corresponding uplink control channel resources according to the feedback mode of the uplink control information and/or the transmission scheme of uplink control channel configured by the Configuring Module, and the uplink control channel resource information received by the Receiving Module;

Sending Module for sending the corresponding feedback information to the said BS on the uplink control channel resources selected by the said Selecting Module.

24. The terminal equipment as in concept 23, wherein, the feedback mode of the uplink control information and/or the transmission scheme of the uplink control channel configured by the said Configuring Module, specifically comprising:

The said terminal equipment is configured to use the feedback mode of ACK/NACK bundling transmission to feed back ACK/NACK information, and use single antenna port to transmit PUCCH; or, The said terminal equipment is configured to use the feedback mode of ACK/NACK multiplexing transmission to feed back ACK/NACK information, and use single antenna port to transmit PUCCH; or, The said terminal equipment is configured to use the feedback mode of ACK/NACK multiplexing transmission to feed back ACK/NACK information, and use the transmit diversity of SORTD to transmit PUCCH; or, The terminal equipment is configured to use the feedback mode of ACK/NACK bundling transmission to feed back ACK/NACK information, and use the transmit diversity of SORTD to transmit PUCCH.

25. The terminal equipment as in concept 24, wherein, when the said terminal equipment is configured to use the feedback mode of ACK/NACK bundling transmission to feed back ACK/NACK information, and use single antenna port to transmit PUCCH, specifically comprising:

If the type of present system is FDD system, the said BS allocating an uplink control channel resource of PUCCH format 1/1a/1b for the said terminal equipment, after bundling the feedback information corresponding to the multiple received data packets, the said Sending Module transmits the said bundled feedback information on the said uplink control channel resource of PUCCH format 1/1a/1b; if no data packet is received by the terminal equipment, or missing data packet is ensured, the said terminal equipment dose not send feedback information to the said BS;

If the type of present system is TDD system, the said BS allocating corresponding number of uplink control channel resources of PUCCH format 1/1a/1b for the said terminal equipment, according to the default rule, after bundling the feedback information corresponding to the multiple received data packets, the said Sending Module transmits the said bundled feedback information on one of the said corresponding number of uplink control channel resources of PUCCH format 1/1a/1b, which corresponding to the last downlink subframe in which actually receiving data transmission, selected by the said Selecting Module; if no data packet is received by the terminal equipment, or missing data packet is ensured, the said terminal equipment does not send feedback information to the said BS.

26. The terminal equipment as in concept 24, wherein, when the said terminal equipment is configured to use the feedback mode of ACK/NACK multiplexing transmission to feed back ACK/NACK information, and use single antenna port to transmit PUCCH, and the said Configuring Module transmitting multi-bit ACK/NACK information by PUCCH format 2/2a/2b, If the type of present system is FDD system, the said BS allocating an uplink control channel resource of PUCCH format 2/2a/2b for the said terminal equipment, after performing joint coding to the feedback information corresponding to the multiple received data packets, the said Sending Module transmits the said feedback information on the said uplink control channel resource of PUCCH format 2/2a/2b;

If the type of present system is TDD system, the said BS allocating one or more uplink control channel resources of PUCCH format 2/2a/2b for the said terminal equipment, according to the size of feedback window, the transmission mode of each downlink carrier and the ability information of terminal equipment, when the power or the uplink transmission capability of the said terminal equipment is limited, if the size of feedback information does not exceed the default threshold, after performing joint coding to the feedback information, the said terminal equipment transmits the said feedback information on one uplink control channel resource of PUCCH format 2/2a/2b, if the size of feedback information exceeds the default threshold, after bundling part of the feedback information and performing joint coding, the said Sending Module transmits the said bundled feedback information on one uplink control channel resource of PUCCH format 2/2a/2b; when the power or the uplink transmission capability of the said terminal equipment is not limited, if the size of feedback information does not exceed the default threshold, after performing joint coding to each feedback information, the said Sending Module transmits the said feedback information on multiple uplink control channel resources of PUCCH format 2/2a/2b, if the size of feedback information exceeds the default threshold, after bundling part of the feedback information and performing joint coding, the said Sending Module transmits the said bundled feedback information on multiple uplink control channel resources of PUCCH format 2/2a/2b.

27. The terminal equipment as in concept 24, wherein, when the said terminal equipment is configured to use the feedback mode of ACK/NACK multiplexing transmission to feed back ACK/NACK information, and use single antenna port to transmit PUCCH, and the said terminal equipment sending multi-bit ACK/NACK information by PUCCH format 1b with channel selection, If the type of present system is FDD system, when the number of ACK/NACK bits is larger than 4, the said Sending Module first bundling the feedback information corresponding to different codewords on a same downlink carrier, then selecting a corresponding uplink control channel resources from multiple uplink control channel resources of PUCCH format 1/1a/1b and generating the feedback information which is to be transmitted according to the state of feedback information, and transmitting the said feedback information which is to be transmitted to the said BS;

If the type of present system is TDD system, when the number of ACK/NACK bits is larger than 4, the said Sending Module first bundling the feedback information corresponding to the data packets on different downlink carriers in a same downlink subframe or bundling the feedback information corresponding to the data packets in different downlink subframes on a same downlink carrier, then selecting a corresponding uplink control channel resource from multiple uplink control channel resources of PUCCH format 1/1a/1b and generating the feedback information which is to be transmitted according to the state of feedback information, and transmitting the said feedback information which is to be transmitted to the said BS.

28. The terminal equipment as in concept 26 or 27, wherein, when the said Configuring Module configures to use the transmit diversity of SORTD to transmit PUCCH, The said Sending Module sending corresponding feedback information to the said BS through the corresponding number of uplink control channel resource pairs, according to the feedback mode of the uplink control information of the said Configuring Module and/or the transmission scheme of the uplink control channel, and the received information of uplink control channel resource.

The invention claimed is:

1. A method for allocating uplink control channel resources comprising:
   recognizing, by a base station (BS), a transmission scheme of uplink control channel for a terminal equipment;
   sending, by the BS, a higher layer signaling to the terminal equipment according to a recognized result, and allocating, by the BS, uplink control channel resources for the terminal equipment for feedbacking ACK/NACK;
   wherein, when the BS recognizes that the terminal equipment is configured to use the feedback mode of ACK/NACK bundling transmission to feed back ACK/NACK, and use the single antenna port to transmit PUCCH, sending, by the BS, the higher layer signaling to the terminal equipment and allocating, by the BS, uplink control channel resources for the terminal equipment for feedbacking ACK/NACK, according to the recognized result, comprising:
   allocating, by the BS, N uplink control channel resources of PUCCH format 1/1a/1b for the terminal equipment; if a type of a present system is FDD system, N=1; if a type of the present system is TDD system, N is the maximum of M on a current TDD uplink and downlink configuration, M is the number of downlink subframes which are feeding back ACK/NACK in a same uplink subframe, N channel resources are corresponding to different downlink subframes respectively;
   wherein, when the BS recognizes that the terminal equipment is configured to use the feedback mode of ACK/NACK multiplexing transmission to feed back ACK/NACK, and use the single antenna port to transmit PUCCH, sending, by the BS, the higher layer signaling to the terminal equipment, and allocating, by the BS, uplink control channel resources for the terminal equipment, according to the recognized result, further comprising:
   when the BS recognizes that the terminal equipment transmits multi-bit ACK/NACK by PUCCH format 2/2a/2b, allocating, by the BS, N uplink control channel resource of PUCCH format 2/2a/2b for the terminal equipment; if a type of the present system is FDD system, N=1; if a type of the present system is TDD system, N is determined according to a size L of a feedback window and capability information of the terminal equipment;
   wherein determining N according to the size L of the feedback window and capability information of the terminal equipment comprises:
   when power or uplink transmission capability of the terminal equipment is limited, N=1; when the number P of the ACK/NACK that to be fed back is larger than 13 bits, determining, by the BS, that the terminal equipment bundles part of the ACK/NACK, P=L while transmitting by single codeword, and P=2×L while transmitting by multiple codewords;
   when the power or the uplink transmission capability of the terminal equipment is not limited, and the number P of the ACK/NACK that to be fed back is large than 13 bits, N=min ($\lceil P/13 \rceil$, Q), wherein Q is the number of PUCCH that are able to simultaneous transmitted by the terminal equipment; when P>N×13, determining, by the BS, that the terminal equipment bundles part of the ACK/NACK, P=L while transmitting by single codeword, and P=2×L while transmitting by multiple codewords;
   wherein when the BS recognizes that the terminal equipment transmits multi-bit ACK/NACK by PUCCH format 1b with channel selection, the BS allocates N uplink control channel resources of PUCCH format 1/1a/1b for the terminal equipment; if the type of the present system is FDD system, N is equal to the size of feedback window, N channel resources are corresponding to different downlink carrier respectively; if the type of the present system is TDD system, N is equal to the maximum of M on the current TDD uplink and downlink configuration, M is the number of downlink subframes which are feeding back ACK/NACK in a same uplink subframe, N channel resources are corresponding to different downlink subframes respectively;
   wherein when the BS recognizes that the terminal equipment is configured to use the transmit diversity of ORTD to transmit PUCCH, sending, by the BS, the higher layer signaling to the terminal equipment, and allocating, by the BS, uplink control channel resource for the terminal equipment, according to the recognized result, comprising:
   allocating, by the BS, 2*N uplink control channel resources for the terminal equipment; wherein N is the number of configured channel resources while transmitting by single antenna port and under the same feedback mode, 2*N channel resources are divided into N pairs, each resource pair comprises 2 channel resources.

2. A method for allocating uplink control channel resources, comprising:
   receiving, by a terminal equipment, a higher layer signaling sent by a base station (BS), and the higher layer signaling carrying information of uplink control channel resource allocated to the terminal equipment for feedbacking ACK/NACK; and
   sending, by the terminal equipment, corresponding feedback information to the BS, according to at least one of a feedback mode of ACK/NACK and a transmission scheme of uplink control channel configured for the terminal equipment, as well as the received information of uplink control channel resource;
   wherein, the at least one of the configured feedback mode of ACK/NACK and the transmission scheme of the uplink control channel for the terminal equipment, comprising:
   configuring the terminal equipment to use a feedback mode of ACK/NACK bundling transmission to feed back ACK/NACK, and to use a single antenna port to transmit PUCCH; or, configuring the terminal equipment to use a feedback mode of ACK/NACK multiplexing transmission to feed back ACK/NACK, and to use the single antenna port to transmit PUCCH; or, configuring the terminal equipment to use the feedback mode of ACK/NACK multiplexing transmission to feed back ACK/NACK, and to use a transmit diversity of SORTD to transmit PUCCH; or, configuring the terminal equipment to use the feedback mode of ACK/NACK bundling transmission to feed back ACK/NACK, and to use the transmit diversity of SORTD to transmit PUCCH;

wherein, when the terminal equipment is configured to use the feedback mode of ACK/NACK bundling transmission to feed back ACK/NACK, and use the single antenna port to transmit PUCCH, the uplink control channel resource information received by the terminal equipment and carried by the higher layer signaling which sent by the BS, comprising:

if a type of a present system is FDD system, allocating, by the BS, an uplink control channel resource of PUCCH format 1/1a/1b for the terminal equipment; and if a type of the present system is TDD system, allocating, by the BS, corresponding number of uplink control channel resources of PUCCH format 1/1a/1b for the terminal equipment, according to a default rule;

wherein, if the uplink control channel resource information is an uplink control channel resource of PUCCH format 1/1a/1b, sending, by the terminal equipment, corresponding feedback information to the BS, according to at least one of the feedback mode of ACK/NACK and the transmission scheme of the uplink control channel configured for the terminal equipment, as well as the received information of uplink control channel resource, comprising:

after bundling feedback information corresponding to multiple received data packets, transmitting, by the terminal equipment, the bundled feedback information on the uplink control channel resource of PUCCH format 1/1a/1b;

if no data packet is received by the terminal equipment, or missing data packet is ensured, not sending feedback information from the terminal equipment to the said BS;

or, if the uplink control channel resource information is the corresponding number of uplink control channel resources of PUCCH format 1/1a/1b, sending, by the terminal equipment, corresponding feedback information to the BS, according to at least one of the feedback mode of ACK/NACK and the transmission scheme of the uplink control channel configured for the terminal equipment, as well as the received information of uplink control channel resource, comprising:

after bundling the feedback information corresponding to the multiple received data packets, transmitting, by the terminal equipment, the bundled feedback information on one of the corresponding number of uplink control channel resources of PUCCH format 1/1a/1b, which corresponds to the last downlink subframe in which actually receiving data transmission;

if no data packet is received by the terminal equipment, or missing data packet is ensured, not sending feedback information from the terminal equipment to the BS.

3. A method for allocating uplink control channel resources, comprising:

receiving, by a terminal equipment, a higher layer signaling sent by a base station (BS), and the higher layer signaling carrying information of uplink control channel resource allocated to the terminal equipment for feedbacking ACK/NACK; and sending, by the terminal equipment, corresponding feedback information to the BS, according to at least one of a feedback mode of ACK/NACK and a transmission scheme of uplink control channel configured for the terminal equipment, as well as the received information of uplink control channel resource;

wherein, the at least one of the configured feedback mode of ACK/NACK and the transmission scheme of the uplink control channel for the terminal equipment, comprising:

configuring the terminal equipment to use a feedback mode of ACK/NACK bundling transmission to feed back ACK/NACK, and to use a single antenna port to transmit PUCCH; or, configuring the terminal equipment to use a feedback mode of ACK/NACK multiplexing transmission to feed back ACK/NACK, and to use the single antenna port to transmit PUCCH; or, configuring the terminal equipment to use the feedback mode of ACK/NACK multiplexing transmission to feed back ACK/NACK, and to use a transmit diversity of SORTD to transmit PUCCH; or, configuring the terminal equipment to use the feedback mode of ACK/NACK bundling transmission to feed back ACK/NACK, and to use the transmit diversity of SORTD to transmit PUCCH.

wherein, when the terminal equipment is configured to use the feedback mode of ACK/NACK multiplexing transmission to feed back ACK/NACK, and use the single antenna port to transmit PUCCH, and if the terminal equipment transmits multi-bit ACK/NACK— by PUCCH format 2/2a/2b, the uplink control channel resource information received by the terminal equipment and carried by the higher layer signaling which sent by the BS, specifically comprising:

if a type of a present system is FDD system, allocating, by the BS, an uplink control channel resource of PUCCH format 2/2a/2b for the terminal equipment; and if a type of the present system is TDD system, allocating, by the BS, one or more uplink control channel resources of PUCCH format 2/2a/2b for the terminal equipment, according to a size of a feedback window, a transmission mode of each downlink carrier and capability information of the terminal equipment;

wherein, if the uplink control channel resource information is an uplink control channel resource of PUCCH format 2/2a/2b, the said terminal equipment sending, by the terminal equipment, corresponding feedback information to the BS, according to at least one of the feedback mode of ACK/NACK and the transmission scheme of the uplink control channel configured for the terminal equipment, as well as the received information of uplink control channel resource, comprising:

after performing joint coding to the feedback information corresponding to the multiple received data packets, transmitting, by the terminal equipment, the feedback information on the uplink control channel resource of PUCCH format 2/2a/2b;

or, if the uplink control channel resource information is one or more uplink control channel resources of PUCCH format 2/2a/2b, sending, by the terminal equipment, corresponding feedback information to the said BS, according to at least one of the feedback mode of ACK/NACK and the transmission scheme of the uplink control channel configured for the terminal equipment, as well as the received information of uplink control channel resource, comprising:

when power or uplink transmission capability of the terminal equipment is limited, if a size of feedback information does not exceed a default threshold, after performing joint coding to the feedback information, transmitting, by the terminal equipment, the feedback information on one uplink control channel resource of PUCCH format 2/2a/2b; if the size of the feedback information exceeds the default threshold, after bundling part of the feedback information and performing joint coding, transmitting, by the terminal equipment, the bundled feedback information on one uplink control channel resource of PUCCH format 2/2a/2b;

when the power or the uplink transmission capability of the terminal equipment is not limited, if the size of the feedback information does not exceed the default threshold, after performing joint coding to each feedback information, transmitting, by the terminal equipment, the feedback information on multiple uplink control channel resources of PUCCH format 2/2a/2b; if the size of feedback information exceeds the default threshold, after bundling part of the feedback information and performing joint coding, transmitting, by the terminal equipment, the bundled feedback information on multiple uplink control channel resources of PUCCH format 2/2a/2b.

4. A terminal equipment, comprising:

a Configuring Module for configuring at least one of feedback mode of ACK/NACK and a transmission scheme of uplink control channel;

a Receiving Module for receiving a higher layer signaling sent by a base station (BS), and the higher layer signaling carrying information of uplink control channel resource allocated to the terminal equipment for feedbacking ACK/NACK;

a Selecting Module for selecting corresponding uplink control channel resources according to at least one of the feedback mode of ACK/NACK and the transmission scheme of uplink control channel configured by the Configuring Module, as well as the uplink control channel resource information received by the Receiving Module; and a Sending Module for sending corresponding feedback information to the BS on the uplink control channel resources selected by the Selecting Module;

wherein, the at least one of the feedback mode of ACK/NACK and the transmission scheme of the uplink control channel configured by the Configuring Module, specifically comprising:

configuring the terminal equipment to use a feedback mode of ACK/NACK bundling transmission to feed back ACK/NACK, and to use a single antenna port to transmit PUCCH; or, configuring the terminal equipment to use a feedback mode of ACK/NACK multiplexing transmission to feed back ACK/NACK, and to use the single antenna port to transmit PUCCH; or, configuring the terminal equipment to use the feedback mode of ACK/NACK multiplexing transmission to feed back ACK/NACK, and to use a transmit diversity of SORTD to transmit PUCCH; or, configuring the terminal equipment to use the feedback mode of ACK/NACK bundling transmission to feed back ACK/NACK, and to use the transmit diversity of SORTD to transmit PUCCH, wherein, when the terminal equipment is configured to use the feedback mode of ACK/NACK bundling transmission to feed back ACK/NACK, and use the single antenna port to transmit PUCCH, if a type of a present system is FDD system, the BS allocates an uplink control channel resource of PUCCH format 1/1a/1b for the terminal equipment, after bundling the feedback information corresponding to the multiple received data packets, the Sending Module transmits the bundled feedback information on the uplink control channel resource of PUCCH format 1/1a/1b; if no data packet is received by the terminal equipment, or missing data packet is ensured, the terminal equipment dose not send feedback information to the BS;

if a type of the present system is TDD system, the BS allocates corresponding number of uplink control channel resources of PUCCH format 1/1a/1b for the terminal equipment, according to a default rule, after bundling the feedback information corresponding to the multiple received data packets, the Sending Module transmits the bundled feedback information on one of the corresponding number of uplink control channel resources of PUCCH format 1/1a/1b, which corresponds to the last downlink subframe in which actually receiving data transmission, selected by the Selecting Module; if no data packet is received by the terminal equipment, or missing data packet is ensured, the terminal equipment does not send feedback information to the BS;

or, when the terminal equipment is configured to use the feedback mode of ACK/NACK multiplexing transmission to feed back ACK/NACK, and use the single antenna port to transmit PUCCH, and the Configuring Module transmits multi-bit ACK/NACK—by PUCCH format 2/2a/2b, if the type of the present system is FDD system, the BS allocates an uplink control channel resource of PUCCH format 2/2a/2b for the terminal equipment, after performing joint coding to the feedback information corresponding to the multiple received data packets, the Sending Module transmits the feedback information on the uplink control channel resource of PUCCH format 2/2a/2b;

if the type of the present system is TDD system, the BS allocates one or more uplink control channel resources of PUCCH format 2/2a/2b for the terminal equipment, according to a size of a feedback window, a transmission mode of each downlink carrier and capability information of the terminal equipment, when power or uplink transmission capability of the terminal equipment is limited, if a size of the feedback information does not exceed a default threshold, after performing joint coding to the feedback information, the terminal equipment transmits the feedback information on one uplink control channel resource of PUCCH format 2/2a/2b, if the size of the feedback information exceeds the default threshold, after bundling part of the feedback information and performing joint coding, the Sending Module transmits the bundled feedback information on one uplink control channel resource of PUCCH format 2/2a/2b; when the power or the uplink transmission capability of the terminal equipment is not limited, if the size of the feedback information does not exceed the default threshold, after performing joint coding to each feedback information, the Sending Module transmits the feedback information on multiple uplink control channel resources of PUCCH format 2/2a/2b, if the size of the feedback information exceeds the default threshold, after bundling part of the feedback information and performing joint coding, the Sending Module transmits the bundled feedback information on multiple uplink control channel resources of PUCCH format 2/2a/2b;

or, when the terminal equipment is configured to use the feedback mode of ACK/NACK multiplexing transmission to feed back ACK/NACK, and use the single antenna port to transmit PUCCH, and the terminal equipment sends multi-bit ACK/NACK—by PUCCH format 1b with channel selection, if the type of the present system is FDD system, when a number of ACK/NACK bits is larger than 4, the Sending Module first bundles feedback information corresponding to different codewords on a same downlink carrier, then selects a corresponding uplink control channel resource from multiple uplink control channel resources of PUCCH format 1/1a/1b and generates feedback information which is to be transmitted according to a state of the feedback information, and transmits the feedback information which is to be transmitted to the BS;

the type of the present system is TDD system, when the number of ACK/NACK bits is larger than 4, the Sending Module first bundles feedback information corresponding to data packets on different downlink carriers in a same downlink subframe or bundles feedback information corresponding to data packets in different downlink subframes on a same downlink carrier, then selects a corresponding uplink control channel resource from multiple uplink control channel resources of PUCCH format 1/1a/1b and generates the feedback information which is to be transmitted according to the state of the feedback information, and transmits the feedback information which is to be transmitted to the BS.

* * * * *